United States Patent
Kirschner

(10) Patent No.: US 10,616,350 B1
(45) Date of Patent: Apr. 7, 2020

(54) SYSTEMS AND METHODS FOR LOCATION-BASED CONTENT SHARING

(71) Applicant: JBK Media LLC, New York, NY (US)

(72) Inventor: Jason Brad Kirschner, New York, NY (US)

(73) Assignee: JBK Media LLC, New York, NY (US)

( * ) Notice: Subject to any disclaimer, the term of this patent is extended or adjusted under 35 U.S.C. 154(b) by 136 days.

(21) Appl. No.: 15/727,993

(22) Filed: Oct. 9, 2017

Related U.S. Application Data

(63) Continuation of application No. 14/809,685, filed on Jul. 27, 2015, now Pat. No. 9,826,048.

(51) Int. Cl.
    *H04L 29/08* (2006.01)

(52) U.S. Cl.
    CPC ............ *H04L 67/18* (2013.01); *H04L 67/306* (2013.01)

(58) Field of Classification Search
    None
    See application file for complete search history.

(56) References Cited

U.S. PATENT DOCUMENTS

| | | | |
|---|---|---|---|
| 7,624,125 B2 | 11/2009 | Feinsmith | |
| 8,566,327 B2 | 10/2013 | Carrico et al. | |
| 8,595,317 B1 * | 11/2013 | Harris | H04L 67/10 709/213 |
| 8,682,895 B1 | 3/2014 | Goel et al. | |
| 2008/0248779 A1 * | 10/2008 | Tsui | H02J 7/0055 455/408 |
| 2009/0037373 A1 | 2/2009 | Gilbert | |
| 2009/0164464 A1 | 6/2009 | Carrico et al. | |
| 2011/0078197 A1 | 3/2011 | Zurko et al. | |
| 2013/0103667 A1 | 4/2013 | Minh | |
| 2013/0124508 A1 | 5/2013 | Paris et al. | |
| 2014/0074712 A1 | 3/2014 | Palmer et al. | |
| 2014/0188991 A1 * | 7/2014 | Dhara | H04L 67/306 709/204 |
| 2014/0229293 A1 * | 8/2014 | Huang | G06Q 30/0273 705/14.69 |
| 2014/0280058 A1 | 9/2014 | St. Clair | |
| 2015/0058324 A1 | 2/2015 | Kauwe | |
| 2015/0065172 A1 * | 3/2015 | Do | H04L 63/107 455/456.3 |
| 2015/0237472 A1 | 8/2015 | Alsina et al. | |
| 2016/0094943 A1 * | 3/2016 | Cao | H04W 4/021 455/456.1 |
| 2016/0112829 A1 * | 4/2016 | Kalb | H04W 4/06 455/456.3 |

(Continued)

*Primary Examiner* — Natisha D Cox
(74) *Attorney, Agent, or Firm* — Zeller IP Group, PLLC; Kyle M. Zeller

(57) ABSTRACT

Systems and methods for location-based content sharing on a network are disclosed. The systems and methods disclosed are directed to sending and receiving various types of content items, including text, images, audio files, and video. Users may receive, evaluate, and further retransmit content items. A user may enter content item filters in order to limit the content items the user receives. A content item filter may include a location filter, a demographic filter, or any other type of filter that may be applied to content items. Demographic filters may include criteria such as age and gender. Location filters may include one or more receiving locations, which may be a point location or an area or a combination of one or more of these.

18 Claims, 15 Drawing Sheets

(56) References Cited

U.S. PATENT DOCUMENTS

2016/0151593 A1* 6/2016 Rapoport ............ A61M 16/026
                                                    128/204.23
2016/0191637 A1   6/2016 Memon
2016/0359987 A1* 12/2016 Laliberte ................ H04L 51/32

* cited by examiner

| Content Item ID | User ID | Content Item Latitude | Content Item Longitude | Sending User Gender | Sending User Age |
|---|---|---|---|---|---|
| 1 | A | 29.951066 | -90.071532 | Female | 23 |
| 2 | B | 29.954897 | -90.074351 | Male | 23 |
| 3 | C | 29.95328 | -90.067163 | Female | 29 |
| 4 | D | 34.052234 | -118.24369 | Female | 25 |

Content ID = 1

Content ID = 2

Content ID = 3

Content ID = 4

| Content Item ID | User ID | Content Item Latitude | Content Item Longitude | Sending User Gender | Sending User Age |
|---|---|---|---|---|---|
| 1 | A | 29.951066 | -90.071532 | Female | 23 |
| 2 | B | 29.954897 | -90.074351 | Male | 23 |
| 3 | C | 29.95328 | -90.067163 | Female | 29 |
| 4 | D | 34.052234 | -118.24369 | Female | 25 |
| 1 | E | 43.073052 | -89.40123 | Male | 25 |

| | User ID (111) | Content Item ID (112) |
|---|---|---|
| 113a | A | 1 |
| 113b | A | 16 |
| 113c | A | 25 |
| 113d | A | 26 |
| 113e | A | 27 |
| 113f | E | 1 |
| 113g | E | 7 |
| 113h | E | 9 |
| 113i | E | 22 |
| 113j | E | 27 |

Fig. 11

SYSTEMS AND METHODS FOR LOCATION-BASED CONTENT SHARING

CROSS-REFERENCE TO RELATED APPLICATIONS

This application is a continuation of U.S. utility patent application Ser. No. 14/809,685, titled "Systems and Methods for Location-Based Content Sharing," filed Jul. 27, 2015, which is incorporated by reference herein in its entirety.

FIELD OF INVENTION

The present invention relates generally to location-based content sharing systems and methods. More specifically, the present invention relates to systems that allow a user to receive content items according to location-based filters and further share content items the user evaluates.

BACKGROUND

In recent years, sharing content through web-based social media sites and other applications has become increasingly popular. A number of applications have been developed to facilitate communications between like-minded users wishing to share content in the form of text, images, video, and other formats.

In some of these applications, persons having similar interests and values may be matched with one another based upon user-entered criteria. However, a drawback of these applications is that, after sharing content, a user generally does not receive feedback from other users who reviewed the content. It would therefore be desirable to provide a method and system for sharing content that would display to the user the extent to which the user's shared content has received positive or negative evaluations as well as location information about those evaluations.

Many existing applications, such as SNAPCHAT (available on the Apple App Store, among other places), allow a user to send content items only to selected persons within the user's list of contacts, thereby limiting the number of potential recipients. It would therefore be desirable to provide a method and system allowing a user to share content with recipients who are not in the user's pre-defined network of contacts.

Other applications directed toward profile matching, such as TINDER (available on the Apple App Store, among other places), allow each user in a network to view profiles shared by other users. Each user evaluates other users' shared content (i.e. user profiles) by providing a preference indication. These preference indications are used to identify potential matches between users. However, there is no further transmission of shared content by the recipient to other users indicating the recipient's evaluation of the shared content. In other words, the application does not allow a recipient to share with other users the fact that the recipient liked an item of shared content. It would therefore be desirable to provide a method and system that allows a recipient to retransmit to others the shared content of another user.

SUMMARY OF THE INVENTION

A location-based content sharing method and system is disclosed which allows a user to receive content items according to location-based filters and further share content items the user evaluates.

In one embodiment, a computer-implemented method for sharing content comprises receiving a content item from a first user and associating with the content item a location of the first user. The method further comprises receiving a location filter of a second user and transmitting the content item to the second user only if the location filter of the second user includes the location of the first user. The method also comprises receiving an evaluation of the content item from the second user and associating with the content item a location of the second user. The method further comprises receiving a location filter of a third user and transmitting the content item to the third user only if the evaluation is positive and the location filter of the third user includes the location of the second user.

In another embodiment, the method further comprises associating with the content item a demographic characteristic of the first user, receiving a demographic filter of a second user, associating with the content item a demographic characteristic of the second user, and receiving a demographic filter of a third user. In this embodiment, transmitting the content item to the second user comprises transmitting the content item only if the demographic filter of the second user includes the demographic characteristic of the first user. Additionally, in this embodiment, transmitting the content item to the third user comprises transmitting the content item only if the demographic filter of the third user includes the demographic characteristic of the second user. Receiving a location filter of a second user may comprise receiving at least one geographical area identified by a center and a radius.

In other embodiment, a computer-implemented method for sharing content comprises receiving a content item from a first user and associating with the content item a location of the first user. The method further comprises receiving a location filter of a second user and transmitting the content item to the second user only if the location filter of the second user includes the location of the first user. The method also comprises receiving an evaluation of the content item from the second user and associating with the content item a location of the second user. The method further comprises adding the content item to a retransmission list only if the evaluation is positive, receiving a location filter of a third user, and transmitting the content item to the third user only if the content item is included in the retransmission list and the location filter of the third user includes the location of the second user. Adding the content item to a retransmission list may comprise adding the content item to the retransmission list only if the retransmission list contains less than a defined number of retransmission list items.

In one embodiment, a non-transitory computer-readable medium comprises instructions that, when executed by a processor, are configured to receive a content item from a first user and associate with the content item a location of the first user. The instructions are further configured to receive a location filter of a second user and transmit the content item to the second user only if the location filter of the second user includes the location of the first user. The instructions are further configured to receive an evaluation of the content item from the second user and associate with the content item a location of the second user. The instructions are also configured to receive a location filter of a third user and transmit the content item to the third user only if the evaluation is positive and the location filter of the third user includes the location of the second user.

In another embodiment, the instructions are further configured to associate with the content item a demographic characteristic of the first user, receive a demographic filter of a second user, associate with the content item a demographic characteristic of the second user, and receive a demographic filter of a third user. In this embodiment, the instructions for transmitting the content item to the second user are further configured to transmit the content item only if the demographic filter of the second user includes the demographic characteristic of the first user. Further, in this embodiment, the instructions for transmitting the content item to the third user are further configured to transmit the content item only if the demographic filter of the third user includes the demographic characteristic of the second user. The instructions configured to receive a location filter of a second user may be configured to receive at least one geographical area identified by a center and a radius.

In one embodiment, a non-transitory computer-readable medium comprises instructions that, when executed by a processor, are configured to receive a content item from a first user and associate with the content item a location of the first user. The instructions are further configured to receive a location filter of a second user and transmit the content item to the second user only if the location filter of the second user includes the location of the first user. The instructions are also configured to receive an evaluation of the content item from the second user, associate with the content item a location of the second user, and add the content item to a retransmission list only if the evaluation is positive. In addition, the instructions are configured to receive a location filter of a third user and transmit the content item to the third user only if the content item is included in the retransmission list and the location filter of the third user includes the location of the second user. The instructions configured to add the content item to a retransmission list may be configured to add the content item to the retransmission list only if the retransmission list contains less than a defined number of retransmission list items.

In another embodiment, a computer system for sharing content comprises a processor and a computer-readable medium that includes computer program code for receiving a content item from a first user and associating with the content item a location of the first user. The medium further includes code for receiving a location filter of a second user and transmitting the content item to the second user only if the location filter of the second user includes the location of the first user. The medium further includes code for receiving an evaluation of the content item from the second user and associating with the content item a location of the second user. The medium also includes code for receiving a location filter of a third user and transmitting the content item to the third user only if the evaluation is positive and the location filter of the third user includes the location of the second user.

In another embodiment, a computer system for sharing content comprises further includes code for associating with the content item a demographic characteristic of the first user; receiving a demographic filter of a second user, associating with the content item a demographic characteristic of the second user, and receiving a demographic filter of a third user. In addition, the code for transmitting the content item to the second user includes codes for transmitting the content item only if the demographic filter of the second user includes the demographic characteristic of the first user. Further, the code for transmitting the content item to the third user includes code for transmitting the content item only if the demographic filter of the third user includes the demographic characteristic of the second user. Receiving a location filter of a second user may comprise receiving at least one geographical area identified by a center and a radius.

In another embodiment, a computer system for sharing content comprises a processor and a computer-readable medium that includes computer program code for receiving a content item from a first user and associating with the content item a location of the first user. The medium further includes code for receiving a location filter of a second user and transmitting the content item to the second user only if the location filter of the second user includes the location of the first user. The medium also includes code for receiving an evaluation of the content item from the second user, associating with the content item a location of the second user, and adding the content item to a retransmission list only if the evaluation is positive. The medium also includes code for receiving a location filter of a third user and transmitting the content item to the third user only if the content item is included in the retransmission list and the location filter of the third user includes the location of the second user. The code for adding the content item to a retransmission list may include code for adding the content item to the retransmission list only if the retransmission list contains less than a defined number of retransmission list items.

These and other aspects of the invention may be more clearly understood by reference to the following detailed description of the invention and the appended claims.

BRIEF DESCRIPTION OF THE DRAWINGS

The preferred embodiments of the present invention are illustrated by way of example and not limited to the following figures.

FIG. 8 illustrates an exemplary database table relating to retransmitted content items.

FIG. 11 illustrates an exemplary table for implementing a retransmission list.

DETAILED DESCRIPTION OF THE INVENTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
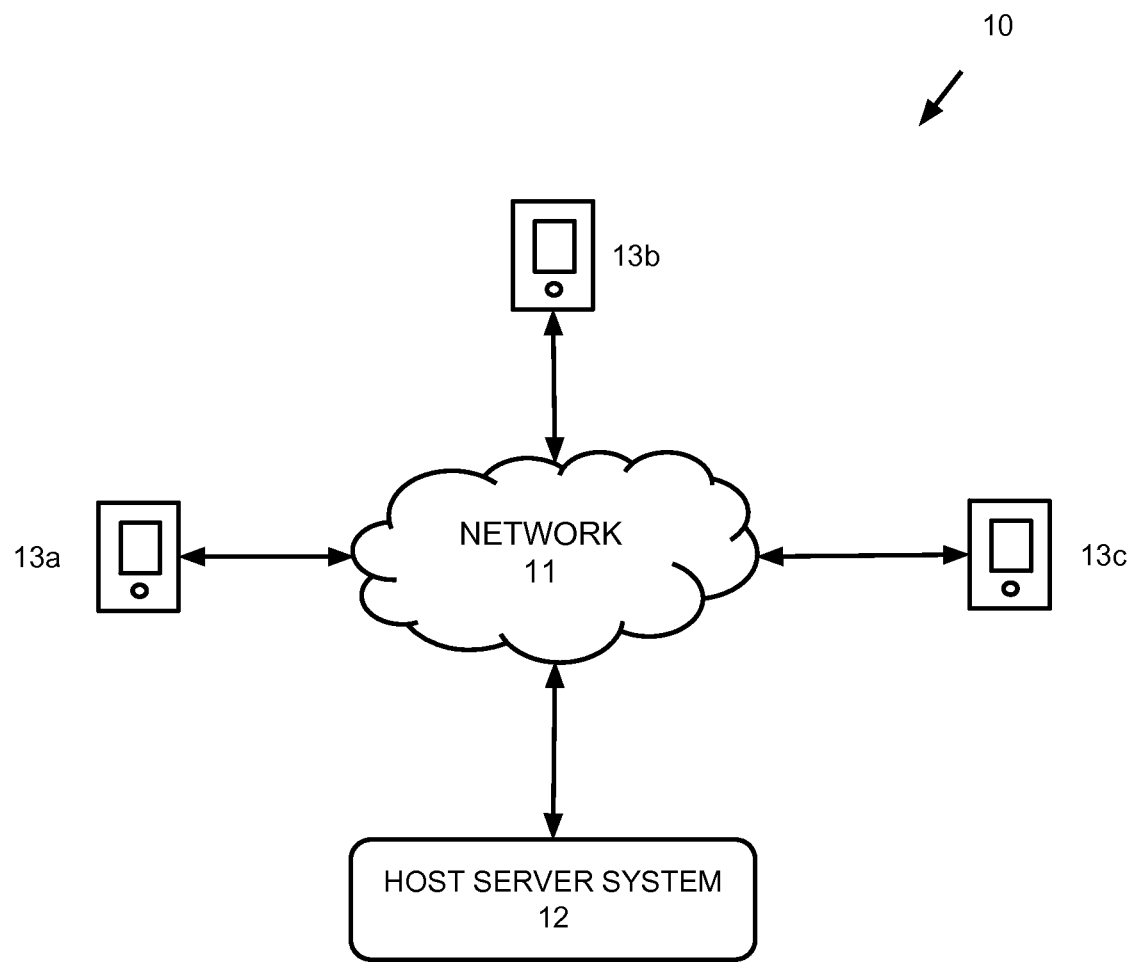
FIG. 1 illustrates a content sharing system in which embodiments of the present invention may be implemented.

FIG. 1 illustrates a content sharing system 10 in which embodiments of the present invention may be implemented. A content sharing system 10 includes a host server system 12 in communication via a network 11 with a plurality of user devices 13. The network may comprise any network (e.g., a telecommunications network in conjunction with the Internet) capable of supporting bidirectional communication between the host server system 12 and the plurality of user devices 13.

Figure 2:
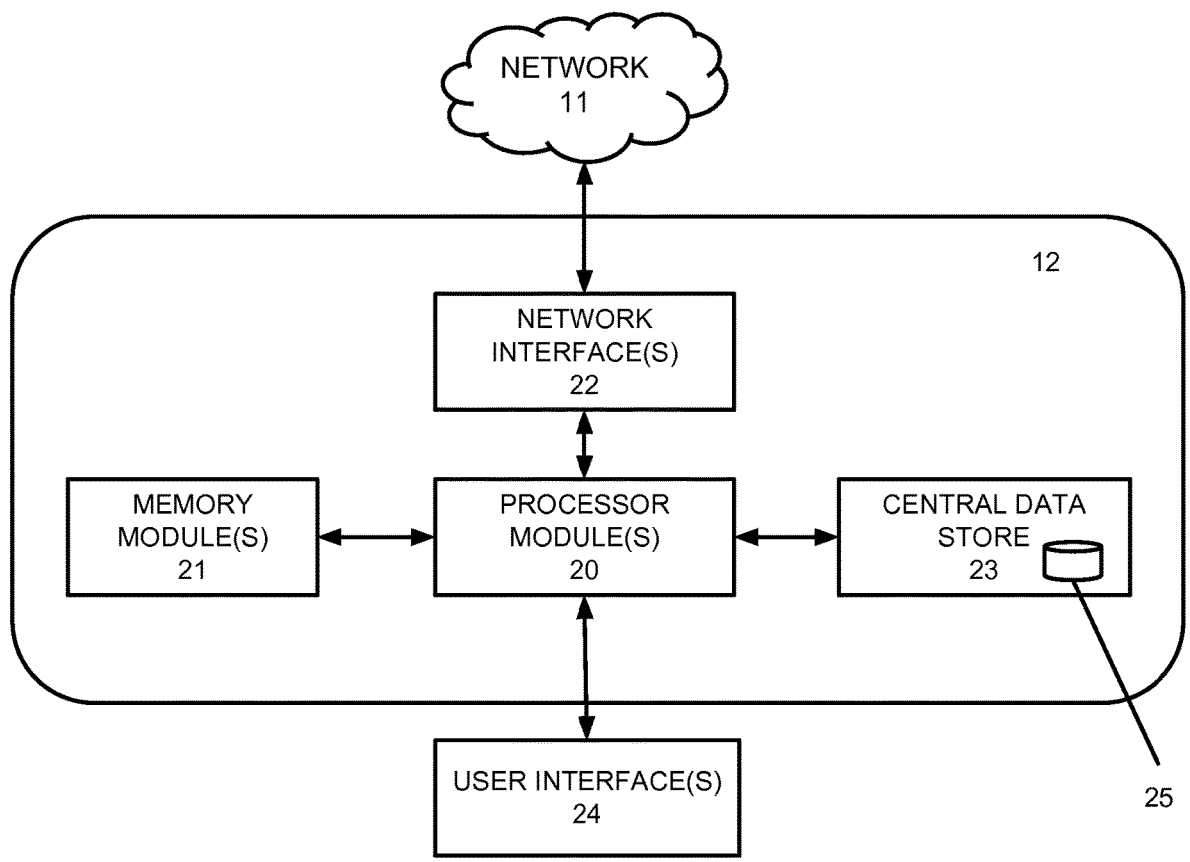
FIG. 2 illustrates an exemplary implementation of a host server system.

FIG. 2 illustrates an exemplary implementation of the host server system 12. The host server system 12 includes one or more processor modules 20 in communication with one or more memory modules 21. The memory modules 21 may include code executable by the processor modules 20 to implement the content sharing described herein. The host server system 12 includes a central data store 23 containing information relating to users of the user devices 13. The exchange of information between the central data store 23 and the user devices 13 is facilitated by one or more network interfaces 22 in communication with user devices 13 on network 11. System operators may interact with the host server system 12 using user interfaces 24 or remotely via network interfaces 22. The central data store 23 may be implemented as one or more data stores or databases 25 spread across one or more servers.

As shown, at least one database 25 may be accessed by the processor modules 20. It will be appreciated that the database may be accessed by the server over a network or via another wired or wireless connection. The server may store desired or required information in the database and may access the same to retrieve the information.

The database 25 may include a number of tables. Exemplary tables include but are not limited to content item table 71, shown in FIG. 7, and retransmission list table 110, show in FIG. 11.

A database 25 may be in communication with an object relational mapping ("ORM") also known as an object relational model or object-relational database management system. It will be appreciated that the ORM may be accessed by processor modules 20 over the network 11 or via physical connection.

The ORM may be in communication with one or more of the following: a Universal Resource Indicator (URI) mapper and a Rest API generator. First, the URI mapper may map a URI into a pointer to an internal program, view, logic, or presentation of data within the system, based on one or more rules of a matching object specified in a collection of mapping objects. The matching object may be a regular expression. The URI mapper may be in communication with a web server The Rest API generator may be in communication with a web server as to send and/or receive data to/from user devices 13 communicating with the server using HTTP and/or HTTPS. The Rest API generator may prepare data stored in the database 25 for delivery to a client device or may prepare data received from a client device for storage in the database. The Rest API may be capable of translating between formats including, but not limited to JSON, XML, CSV, and the like. The Rest API may be capable of automatically generating URIs based upon data structures observed in the ORM for access by client devices.

A web server may be adapted to deliver web pages on request to users using the Hypertext Transfer Protocol (HTTP and/or HTTPS) or similar protocols. This allows for delivery of HTML documents and any additional content that may be included by a document, such as images, style sheets and scripts.

A user device 13 may employ a web browser or similar client application to engage in communication with a web server. For example, a client application may make a request for a specific resource using HTTP/HTTPS and the web server may respond with the content of that resource or an error message if unable to do so. The resource may be data or a file stored in a database 25. The web server can receive content from a user, possibly using HTTP/HTTPS.

In certain embodiments, a user may access the host server system 12 (i.e., an application running on the server) through a user device 13 connected to a network 11. A user device 13 may be any device capable of accessing the server such as by running a client application or other software, like a web browser or web-browser-like application. In one embodiment, a user device 13 may comprise, for example, an input/output device, a display, a processor, memory, and/or audio equipment such that the user may utilize the user device to create and/or edit documents using the word processor. Exemplary user devices include, but are not limited to, general purpose computers, laptops, cell phones, smart phones, personal digital assistants, televisions, tablets, and the like. Once an access device establishes a connection to the host server system 12, such as through the network 11, the user may log into the system to access a content sharing program.

Figure 3:
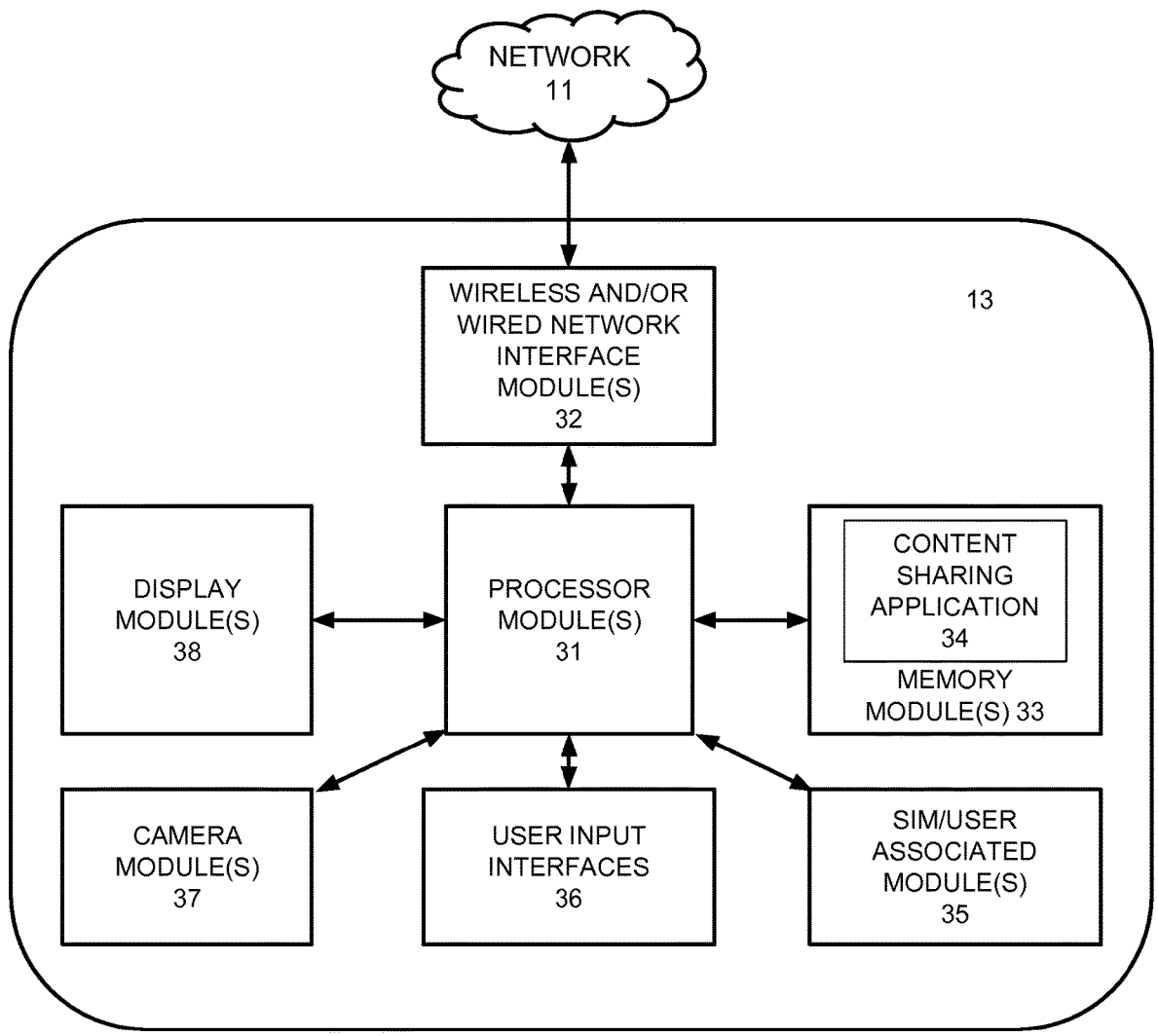
FIG. 3 illustrates an exemplary user device.

FIG. 3 illustrates an exemplary user device 13. User device 13 includes one or more processor modules 31 in communication via a system bus with one or more memory modules 33. The memory module 33 contains data as well as program code for a content sharing application 34 executable by the processor module 31. Execution by the processor module 31 results in, for example, generation of user interface screens facilitating the content sharing described herein. The exemplary user device 13 is configured to send information to, and receive information from, the network 11 via a network interface module 32. In embodiments in which the user device 13 comprises a wireless device, the network interface module 32 may include, for example, a wireless transceiver capable of communicating with devices on network 11. The processor module 31 may also communicate with camera module 37 and a SIM/user-associated module 35. Users may interact with the client device 13 via one or more user input interfaces 36 and a display module 38.

An exemplary content sharing application 34 may comprise HTML data, images, icons, and/or executable code. The executable code may be composed in JavaScript, ECMAscript, CoffeeScript, Python, Ruby or other programming languages suitable for execution within the content sharing application 34, or translation into a client application executable form.

The content sharing application 34 is typically adapted to present various user interfaces to a user. Such user interfaces may be based on information sent by the content sharing system, and may allow the user to send and receive data. The content sharing application 34 may allow the user to create and/or manipulate content items, filters, preferences, etc. via various user interfaces, and to communicate the same to the host server system 12.

It will be apparent to one of ordinary skill in the art that, in certain embodiments, any of the functionality of the user device 13 may be incorporated into the host server system 12, and vice versa. Likewise, any functionality of a content sharing application 34 may be incorporated into a browser-based client, and such embodiments are intended to be fully within the scope of the invention. For example, a browser-based content sharing application could be configured for offline work by adding local storage capability, and a native application could be distributed for various native platforms via a software layer that executes the browser-based program on the native platform.

In one embodiment, communication between a content sharing application and a content sharing program may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Similarly, communications of data between the user device 13 and the host server system 12 may be continuous and automatic, or may be user-triggered. For example, the user may click a button, causing the client to send data to the host server system 12. Alternately, a content sharing application 34 may automatically send updates to the host server system 12 periodically without prompting by a user. If a user device 13 sends data autonomously, the host server system 12 may be configured to transmit this data, either automatically or on request, to additional user devices 13, thereby enabling multi-user online concurrent editing of the same document.

The server may be capable of communicating user-populated and/or automatically-populated database table entries to third party systems, and may notify users of such communications.

It will be recognized that any other suitable software or hardware or combinations thereof may be used with the exemplary content sharing systems and applications disclosed herein. Moreover, such applications may be implemented at any suitable location in FIG. 1, such as but not limited to at the host server system 12, at the user device 13, or at a location not pictured.

Unless specifically stated otherwise, as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

Generally, the systems and methods disclosed herein can be implemented by hardware, software, firmware, middleware, microcode, or any combination thereof, or is implemented on a cloud-based or visualized network system. In one embodiment, the techniques disclosed herein may be implemented in software such as an operating system or in an application running on an operation system. In another embodiment, the system may be integrated into a mobile application that allows users to interact with a content sharing system via a mobile application. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameter, or memory contents. Information, arguments, parameters, data, etc. may be passed, forwarded, or transmitted through any suitable means including memory sharing, message passing, token passing, network transmission, etc.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a flash memory device, such as a compact flash card or USB flash drive.

Some exemplary embodiments described herein are described as software executed on at least one computer, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

It will be apparent to one of ordinary skill in the art that the examples provided herein involving specific programming languages, scripting languages, data formats, specific software or programs, and other details are exemplary and that variations on any of these details are aspects of and are intended to be within the scope of the present invention. For example, although a content sharing program may be described herein as being separate from a communication program, it will be appreciated that a single program may include the functionality of both programs.

Content Items

Figure 4:
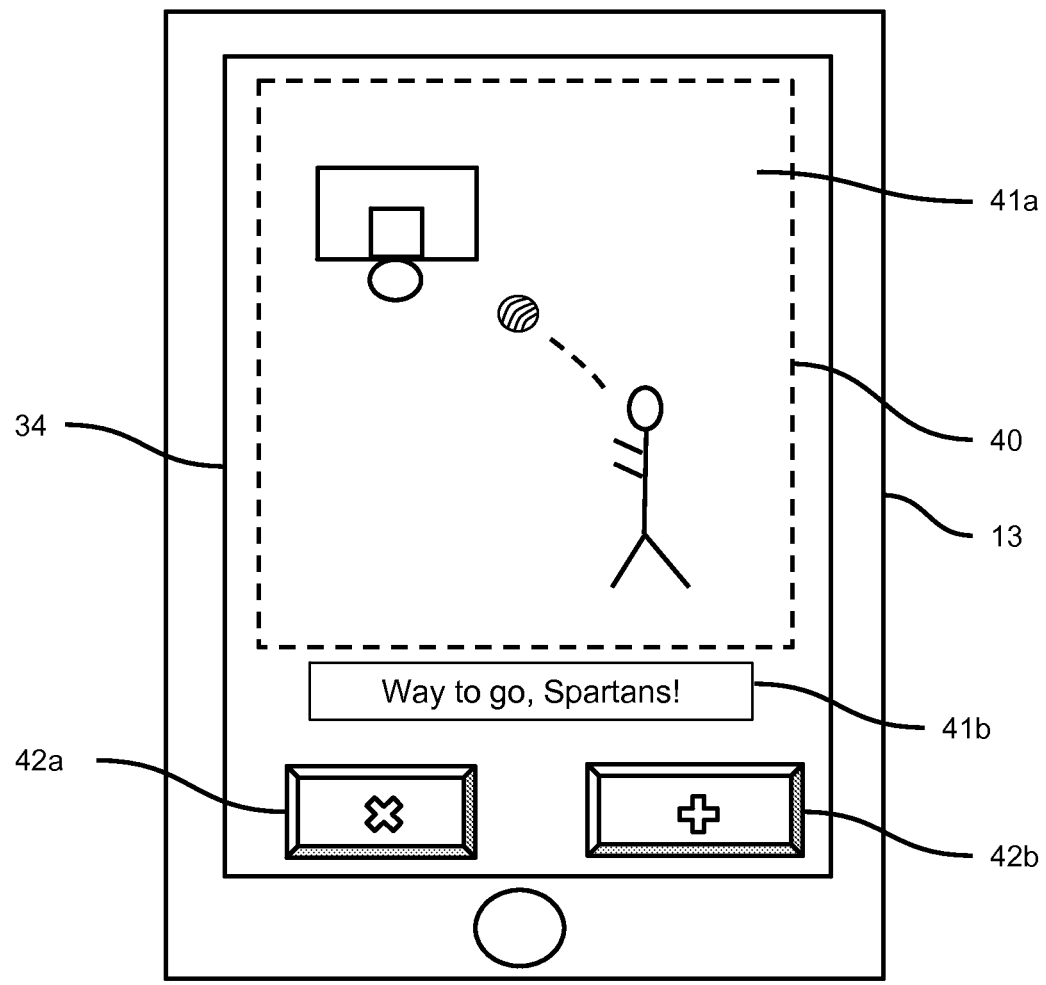
FIG. 4 illustrates an exemplary content item displayed on a user device.

A content item may comprise one or more content elements. A content element may be a text element, an audio element, a photograph, a video, or any other type of data. FIG. 4 illustrates an exemplary content item 40 displayed on a user device 13 within content sharing application 34. The content item 40 comprises content elements 41. In this exemplary embodiment, content item 41a is a photograph of a basketball player successfully making a jump shot and content element 41b is a text comment stating "Way to go, Spartans!"

Content items may be composed of content elements created using a user device 13 or content elements gathered from other sources or a combination of these. For example, a content item may comprise a photograph taken with the user device 13 and/or a song downloaded from the Internet.

Uploading Content Items

A user may send content items to other users by uploading content items to the host server system 12. A sending user may upload a content item 40 onto the host server system 12 using a user device 13 and a content sharing application 34. As described above, the user device 13 may be a mobile phone, a laptop, a desktop computer, or any other device capable of transmitting data to the host server system 12. The content sharing application 34 is software installed on the user device 13 that, among other things, allows the user to send and receive content items.

The system associates the content item with a content item location. A content item location may be a point or an area or a combination of one or more of these. For example, a content item location may be GPS coordinates, an area defined by a center point and a radius, a rectangle defined by four GPS coordinates, a predefined area corresponding to a political designation (e.g. "the city of New Orleans"), or any other type of location designation. When a content item location is defined using a center point and a radius, the center may be the sending user's current location in GPS coordinates, another location in GPS coordinates, a city center, or any other type of data capable of defining a center point. The radius may be a distance measured in units for measuring distance (e.g., miles, kilometers, feet, or meters) or may be a relative distance designation (e.g., "nearby", "within city", "within state", etc.).

In one embodiment, prior to transmitting the content item to the host system server 12, the content sharing application 34 tags the content item with a content item location that is the user's physical location (in GPS coordinates). In other embodiments, the host system server 12, rather than the content sharing application 34, tags the content item with a content item location.

The content item location may be a location other than a user's physical location and may be associated with a content item at any time. For example, the host system server 12 may associate with the content item an uploading user's static home address, a location entered by the user at the time the content item was created, or any other address.

Receiving Content Items

In addition to uploading content items, a user may receive content items. In other words, a single user may be both a sending user (sender) and receiving user (receiver). A receiving user may create a content item filter by entering filter criteria that determine the content items the user will receive. The content item filter may include a location filter, a demographic filter, or any other type of filter that may be applied to content items. A demographic filter may include criteria such as age and gender.

Figure 5:
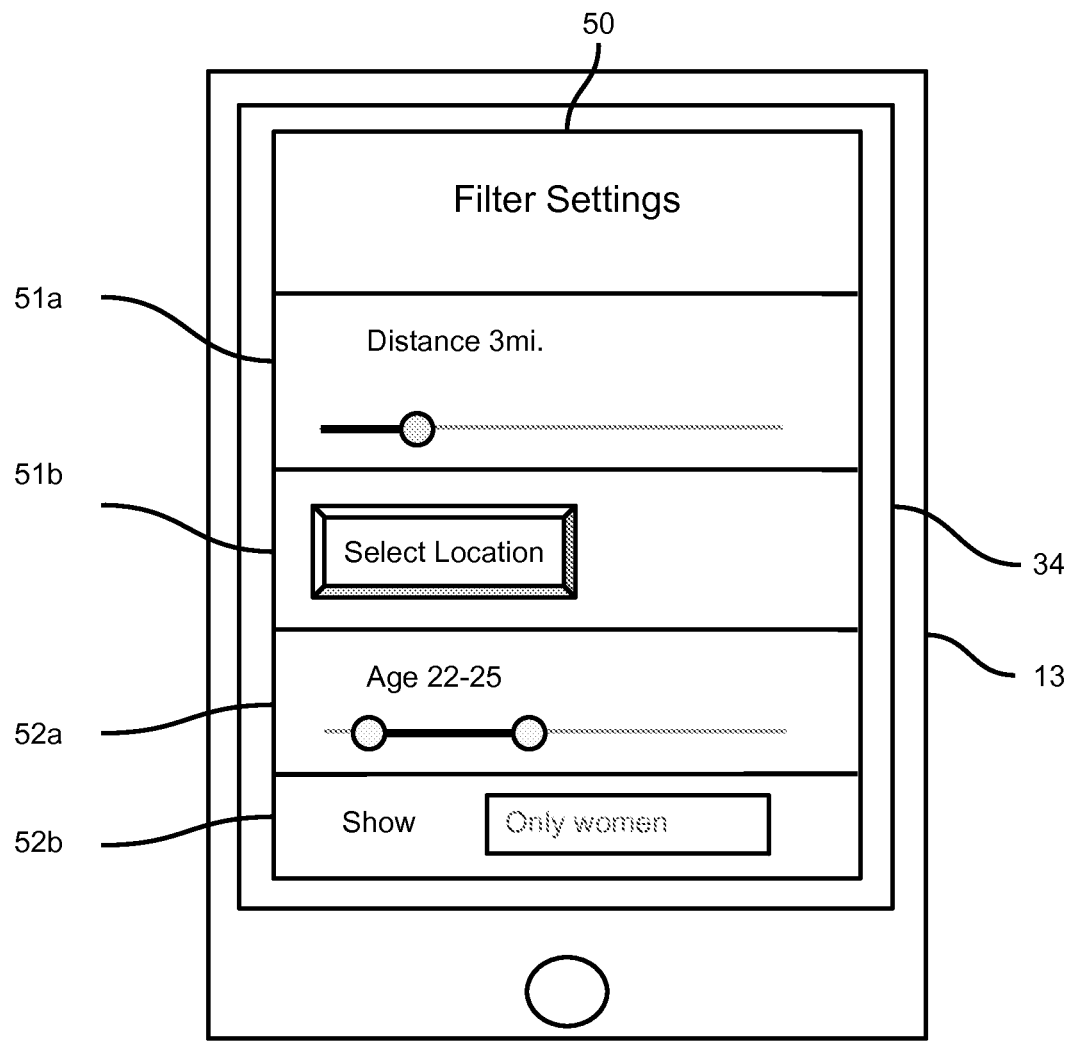
FIG. 5 illustrates an exemplary content item filter displayed on a user device.

FIG. 5 illustrates an exemplary content item filter 50 displayed on a user device 13 within content sharing application 34. The content item filter 50 comprises location filters 51 and demographic filters 52. In this exemplary embodiment, the location filter 51a filters out content items that have a content item location more than 3 miles from locations that are selected using the location filter 51b. In this embodiment, the location filter 51b is implemented as an input button that opens the data entry screen depicted in FIG. 6. The demographic filter 52a filters out content items transmitted by users who are not within 22-25 years of age. The demographic filter 52b filters out content items transmitted by users who are not women.

A location filter may include one or more receiving locations. A receiving location may be a point or an area or a combination of one or more of these. For example, a receiving location may be GPS coordinates, an area defined by a center point and a radius, a rectangle defined by four GPS coordinates, a predefined area corresponding to a political designation, or any other type of location designation. When a receiving location is defined using a center point and a radius, the center may be the receiving user's current location in GPS coordinates, another location in GPS coordinates, a city center, or any other type of data capable of defining a center point. The radius may be a distance measured in units for measuring distance (e.g., miles, kilometers, feet, or meters) or may be a relative distance designation (e.g., "nearby", "within city", "within state", etc.)

Figure 6:
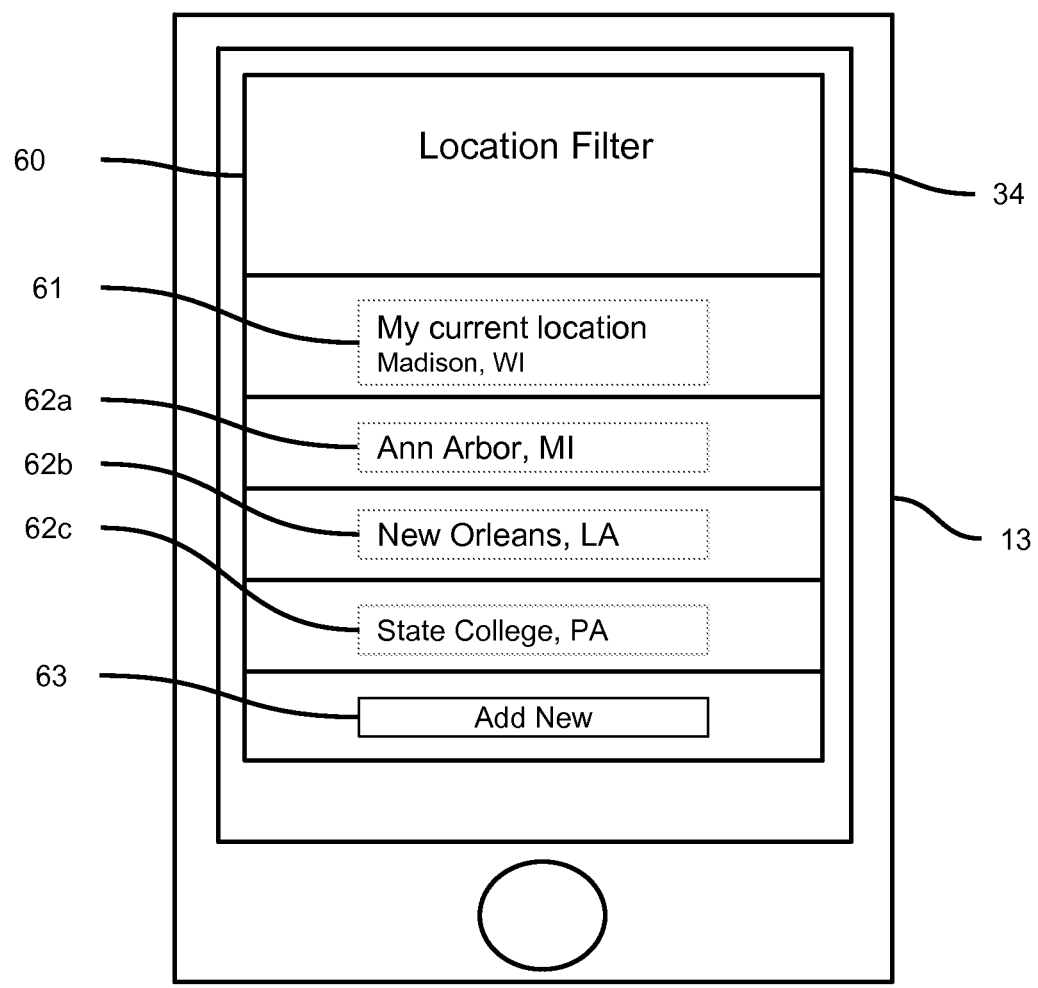
FIG. 6 illustrates an exemplary receiving location filter for use in a content sharing application.

FIG. 6 illustrates an exemplary receiving location filter 60 for use in the content sharing application 34. A receiving user may select locations from which to receive content items by tapping an "Add New" button 63. The user may select the user's current location 61 and/or other designated locations 62. In this exemplary embodiment, the user has selected his current location 61, which is Madison, Wis., and has selected Ann Arbor, Mich. (62a), New Orleans, La. (62b), and State College, Pa. (62c) as additional designated locations 62.

Figure 7:
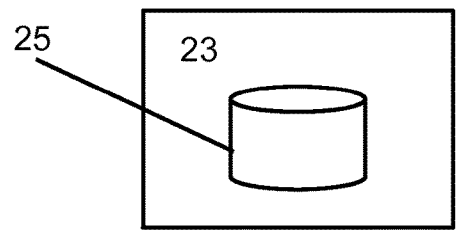
FIG. 7 illustrates an exemplary database table in a content item database for storing location and demographic information relating to content items.
Figure 7:
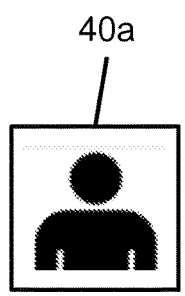
Figure 7:
Figure 7:
Figure 7:
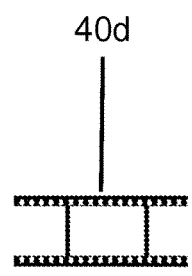

FIG. 7 illustrates an exemplary database table 71 in content item database 25 for storing location and demographic information relating to content items 40 which are stored in a central data store 23. It will be appreciated by those skilled in the art that the database table may also be implemented as multiple tables in a relational database system. In this exemplary embodiment, content item 40a is a photograph stored as an MPEG file, content item 40b is an audio file stored as an MP3 file, content item 40c is a text item stored as a database record, and content item 40d is a video stored as an MP4 file. Database table 71 comprises column 72 for storing content item unique IDs, column 73 for storing unique User IDs, column 74 for storing content item latitude, column 75 for storing content item longitude, column 76 for storing the gender of the user who sent the content item, and column 77 for storing the age of the user who sent the content item. Rows 78a, 78b, 78c, and 78d contain information relating to content items 40a, 40b, 40c, and 40d, respectively. Row 78a (content item ID=1), which corresponds to photograph 40a, is a data record containing latitude and longitude values corresponding to a location in New Orleans, La., a gender value of "female," and an age value of 23 years of age. Row 78b (content item ID=2), which corresponds to audio file 40b, is a data record containing latitude and longitude values corresponding to a location in New Orleans, La., a gender value of "male," and an age value of 23 years of age. Row 78c (content item ID=3), which corresponds to text item 40c, is a data record containing latitude and longitude values corresponding to a location in New Orleans, La., a gender value of "female," and an age value of 29 years of age. Row 78d (content item ID=4), which corresponds to video file 40d, is a data record containing latitude and longitude values corresponding to a location in Los Angeles, Calif., a gender value of "female," and an age value of 25 years of age.

Application of Filters

Based on the exemplary content item filter depicted in FIG. 5 and FIG. 6, which is set to receive content items sent by women between the ages of 22 and 25 who are within 3 miles of Madison, Wis., Ann Arbor, Mich., New Orleans, La., and State College, Pa., only content items corresponding to row 78a will be transmitted to the receiving user who created the content item filter. Row 78a will be transmitted because the content item latitude and longitude matches New Orleans, La. (which is, by definition, within 3 miles of New Orleans), the gender matches "female", and an age of 23 is between 22 and 25 years of age. Row 78b will be filtered out because the value of "male" does not match the filter criterion of "female". Row 78c will be filtered out because the age value of 29 is not between 22 and 25 years of age. Row 78d will be filtered out because the content item location corresponds to Los Angeles, Calif., which is not within 3 miles of the four cities identified in the receiving location filter 60.

Evaluation

In an exemplary embodiment, in order to receive additional content items, the receiving user must first evaluate the current content item. In other words, the receiving user advances through content items by providing an evaluation for the most recent content item transmitted to the receiving user. Once a content item has been evaluated, another content item will become available (provided that additional content items match the receiving user's filter criteria).

Referring again to FIG. 4, an exemplary embodiment illustrates input buttons for entering an evaluation of a content item 40. Input button 42a is a "Dislike" button, which the receiving user can tap to give the content item a negative evaluation. Input button 42b is a "Like" button, which the receiving user can tap to give the content item a positive evaluation. It will be appreciated by those skilled in the art that positive evaluations may be entered in various ways, including by swiping left or right or up or down, or by scrolling to the next content item, or by not giving the content item a negative evaluation (thus implying a positive evaluation).

In one embodiment, once a receiving user has given a content item a negative evaluation, it is no longer viewable on the receiving user's user device 340.

Retransmission

In one embodiment, if the receiving user gives a content item a positive evaluation, the content item may be retransmitted. In an exemplary embodiment, a content item may become eligible for retransmission when the host server system 12 creates a new record in a content item database table based on a receiving user's positive evaluation of the content item.

FIG. 8 illustrates exemplary database table 71 that contains a record 80 corresponding to a retransmitted content item. Assuming that the receiving user (User E) who set the content filters depicted in FIG. 5 and FIG. 6 was a male, aged 25, and located in Madison, Wis., and also assuming that he received a content item corresponding to row 78a and gave it a positive evaluation, the host server system 12 may make the content item eligible for retransmission by creating row 80 in exemplary database table 71. Row 80 contains a value of 1 in Content Item ID column 72, which is equal to the value in row 78a, indicating that both rows are associated with the same content item, i.e., photograph 40a. Column 73 of Row 80 contains the receiving user's unique User ID, which is "E". Row 80 contains the receiving user's location information in content item latitude column 74 and content item longitude column 75; the values correspond to Madison, Wis., where the receiving user is located. Row 80 contains a value of "Male" in the "Sending User Gender" column 76 because the receiving user is "male". When the content item is retransmitted, the receiving user will become the "sender"; therefore, it is appropriate that his gender appear in the column labeled "Sending User Gender". Likewise, Row 80 contains a value of 25 in the "Sending User Age" column 77, which is equal to the receiving user's age. In this embodiment, the content item will be retransmitted if the record 80 matches another user's content item filter.

In some embodiments, the host server system 12 may not retransmit a content item if the date associated with the content item record is more than a defined amount of time in the past, e.g., a content item that was created or last transmitted more than two weeks ago may not be transmitted to users.

Figure 9:
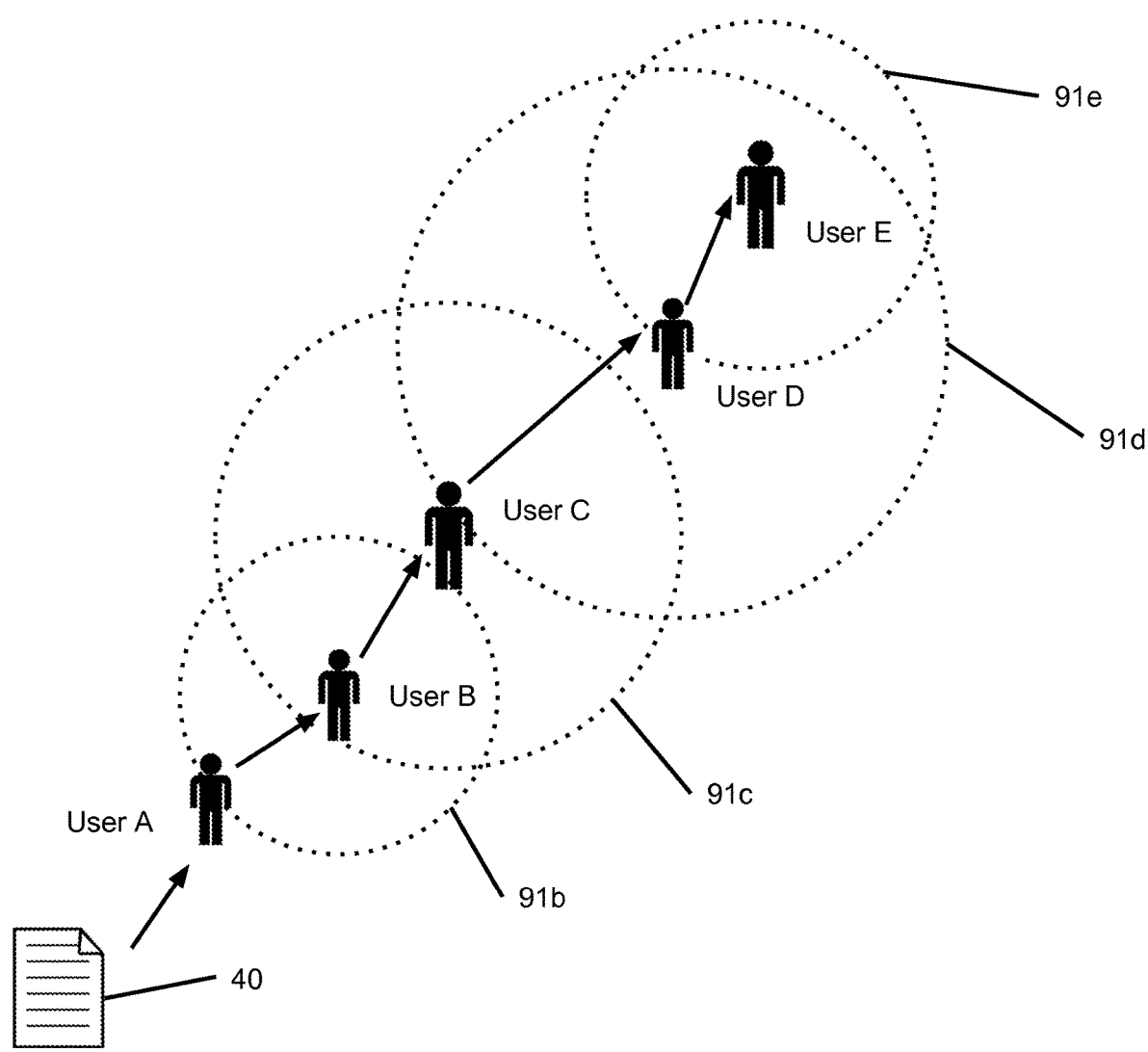
FIG. 9 illustrates a content item being retransmitted from one user to another.

Content items may be retransmitted more than once, resulting in a chain of retransmitted content items. FIG. 9 illustrates a content item being retransmitted from one user to another. The retransmissions depicted in this figure assume that the receiving user's demographic filter criteria, if any, are satisfied. The following retransmissions occur:

Receiving User A receives content item 40 and gives it a positive evaluation. Receiving User B has set location filter criteria resulting in a receiving radius 91b. Because User A's location falls within radius 91b, content item 40 will be transmitted to User B.

Receiving User B receives content item 40 and gives it a positive evaluation. Receiving User C has set location filter criteria resulting in a receiving radius 91c. Because User B's location falls within radius 91c, content item 40 will be transmitted to User C.

Receiving User C receives content item 40 and gives it a positive evaluation. Receiving User D has set location filter criteria resulting in a receiving radius 91d. Because User C's location falls within radius 91d, content item 40 will be transmitted to User D.

Receiving User D receives content item 40 and gives it a positive evaluation. Receiving User E has set location filter criteria resulting in a receiving radius 91e. Because User D's location falls within radius 91e, content item 40 will be transmitted to User E.

Receiving User E receives content item 40 and gives it a negative evaluation. Retransmission ends with respect to User E.

In one embodiment, a content item may be retransmitted in such a way that it is routed around a receiving user who gives it a negative evaluation, so long as additional receiving users are relatively nearby and give the content item a positive evaluation.

Figure 10:
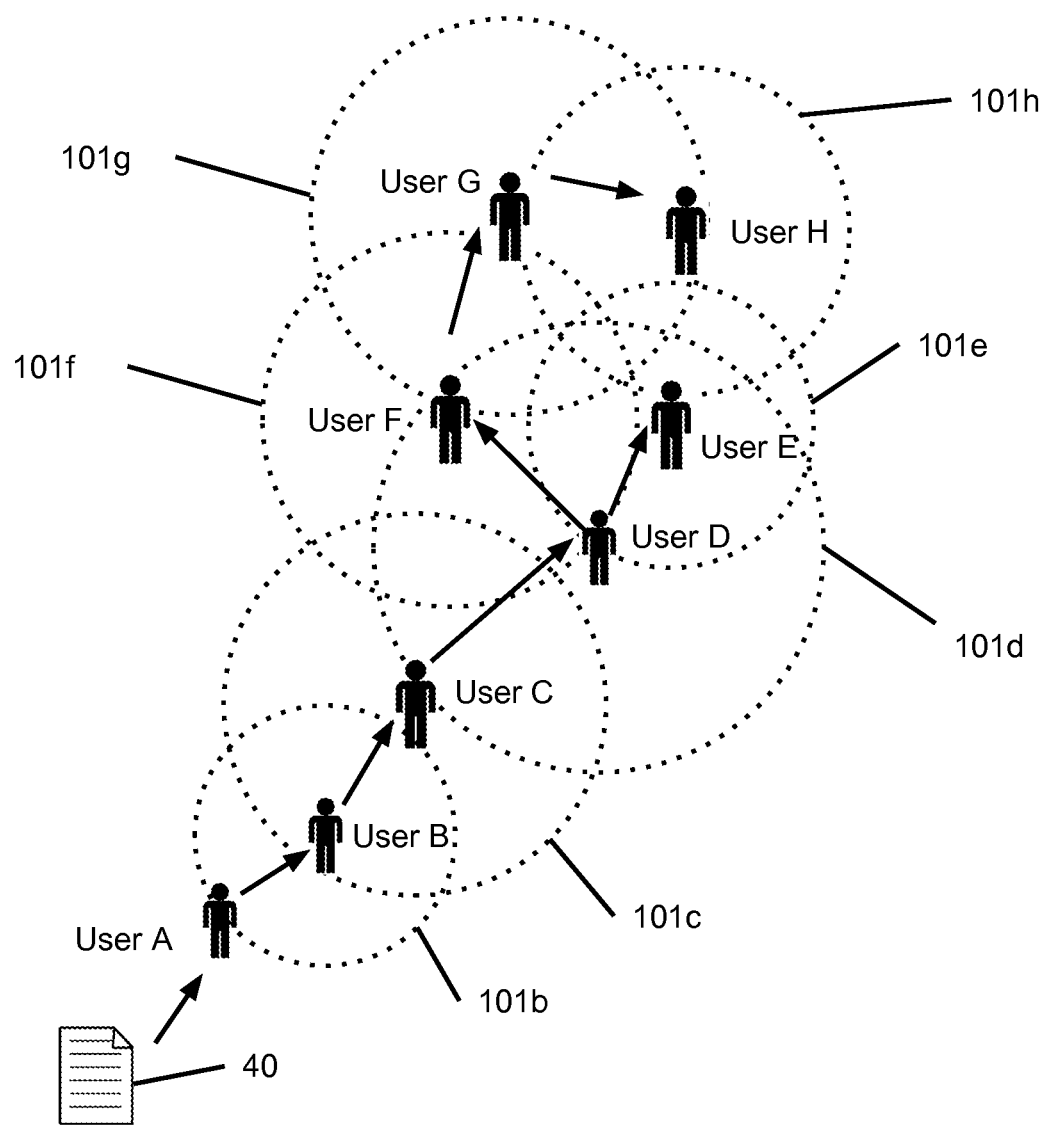
FIG. 10 illustrates a content item being routed around a user who has given a content item a negative evaluation.

FIG. 10 illustrates a content item being routed around User E, who has given the content item a negative evaluation. User H receives the content item even though transmission from User E to User H did not occur due to User E's negative evaluation of the content item. Instead, the content item is transmitted in a chain from User D to User F to User G to User H. In FIG. 10, the retransmissions described above with respect to FIG. 9 occur with respect to Users A-E. Again, the retransmissions depicted in this figure assume that the receiving user's demographic filter criteria, if any, are satisfied. The following additional retransmissions occur:

Receiving User D receives content item 40 and gives it a positive evaluation. Receiving User F has set location filter criteria resulting in a receiving radius 101f. Because User D's location falls within radius 101f, content item 40 will be transmitted to User F.

Receiving User F receives content item 40 and gives it a positive evaluation. Receiving User G has set location filter criteria resulting in a receiving radius 101g. Because User F's location falls within radius 101g, content item 40 will be transmitted to User G.

Receiving User G receives content item 40 and gives it a positive evaluation. Receiving User H has set location filter criteria resulting in a receiving radius 101h. Because User G's location falls within radius 101h, content item 40 will be transmitted to User H.

Receiving User H receives content item 40 and gives it a negative evaluation. Retransmission ends with respect to User H.

In one embodiment, the data representing the content item remains in a fixed format as the content item is retransmitted, e.g. a single file in a data store represents the content item and multiple content item database records (representing retransmissions of the content item) point to the single file. In other embodiments, the content item may be modified from its original state as it is retransmitted, e.g. the content item itself may be copied into multiple files corresponding to multiple users in the retransmission chain.

Retransmission List

In one embodiment, a retransmission list limits the number of content items a user may retransmit at any one time. For example, the transmission list may allow a user to retransmit only 20 content items at one time. The retransmission list may be based on several factors, including the most recent content items the user has evaluated positively, content items the user has marked as "favorites," content items the user has marked specifically "for transmission," and so forth.

FIG. 11 illustrates an exemplary table 110 for implementing a retransmission list. User ID column 111 contains unique User IDs for each user and Content Item ID column 112 contains unique Content Item IDs. Row 113a contains a record indicating that the content item with Content Item ID=1 is included in User A's retransmission list. Rows 113b, 113c, 113d, and 113e indicate that content items with Content Item IDs=16, 25, 26, and 27, respectively, are on User A's retransmission list. Rows 113f, 113g, 113h, 113i, and 113j indicate that content items with Content Item IDs=1, 7, 9, 22 and 27, respectively, are on User E's retransmission list. In an exemplary embodiment, table 71, shown in FIG. 7 and FIG. 8, is joined with table 110, shown in FIG. 11, in order to determine whether content items will be retransmitted. Only rows in table 71 that have corresponding rows in table 110 (joined using the "User ID" and "Content Item ID" columns in both tables) will be retransmitted. One skilled in the art will recognize that the retransmission list can be implemented in a number of ways, including multiple tables in a relational database, a single "Yes/No" column, counters implemented in code, etc.

Process Flow

Figure 12:
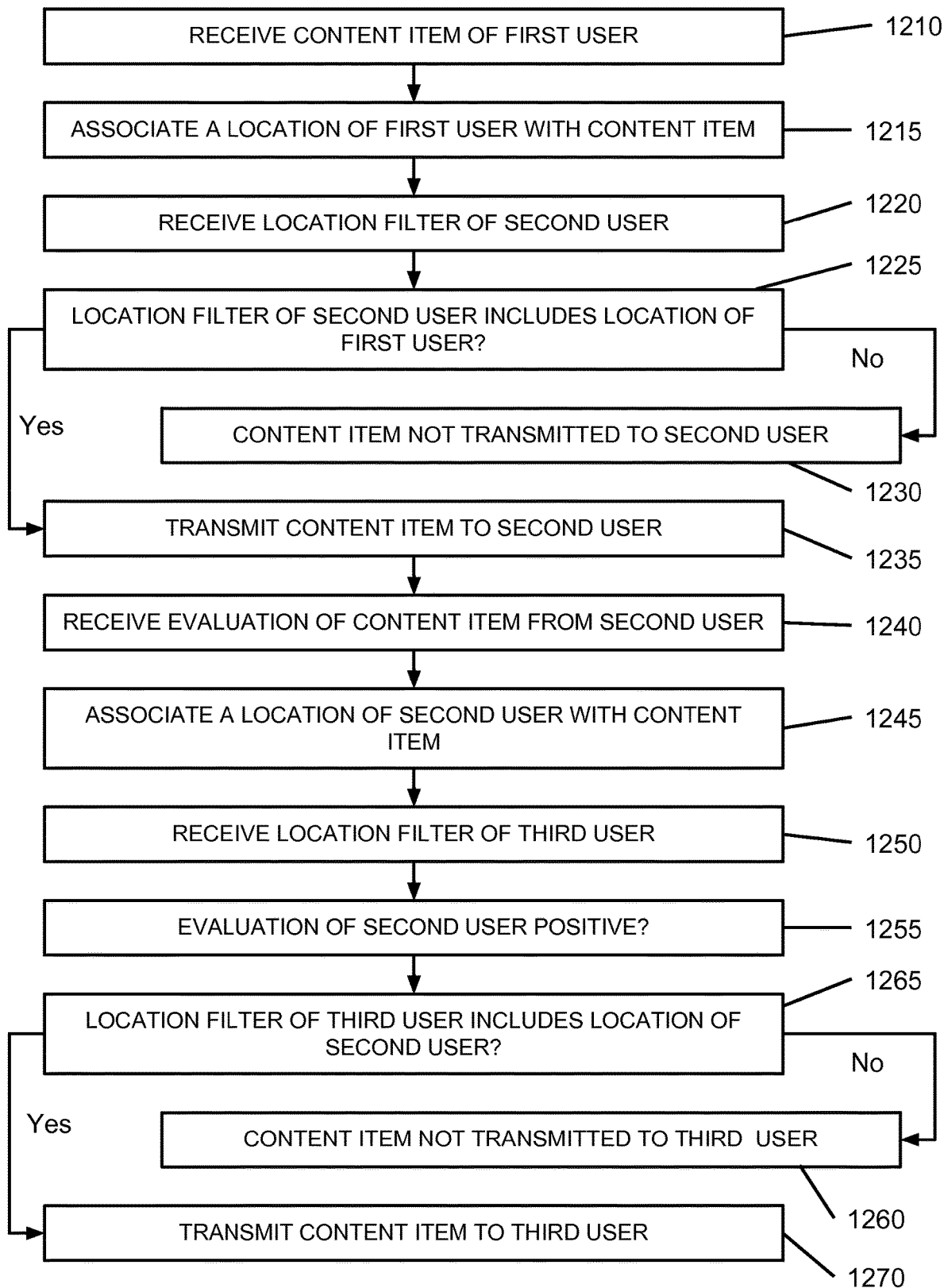
FIG. 12 is a flow diagram illustrating a method for sharing content according to one embodiment of the present disclosure.

FIG. 12 is a flow diagram illustrating a method for sharing content according to one embodiment of the present disclosure. At step 1210, a host server system 12 receives a content item from a first user. At step 1215, the host server system 12 associates with the content item a location of the first user. At step 1220, the host server system 12 receives a location filter of a second user. At step 1225, the host server system 12 determines whether the location filter of the second user includes the location of the first user. At step 1235, if the location filter of the second user includes the location of the first user, the host server system 12 transmits the content item to the second user. At step 1230, if the location filter of the second user does not encompass the location of the first user, host server system 12 does not transmit the content item to the second user. At step 1245, the content item having been transmitted to the second user, the host server system 12 receives an evaluation of the content item from the second user. At step 1245, the host server system 12 associates with the content item a location of a second user. At step 1250, the host server system 12 receives a location filter of a third user. At step 1255, the host server system 12 determines whether the evaluation of the second user is positive. At step 1260, if the evaluation from the second user is not positive, the content item is not transmitted to the third user. At step 1265, the host server also determines whether the location filter of the third user includes the location of the second user. At step 1270, if the evaluation of the second user is positive and the location filter of the third user includes the location of the second user, the host server system 12 transmits the content item to the third user.

Figure 13A:
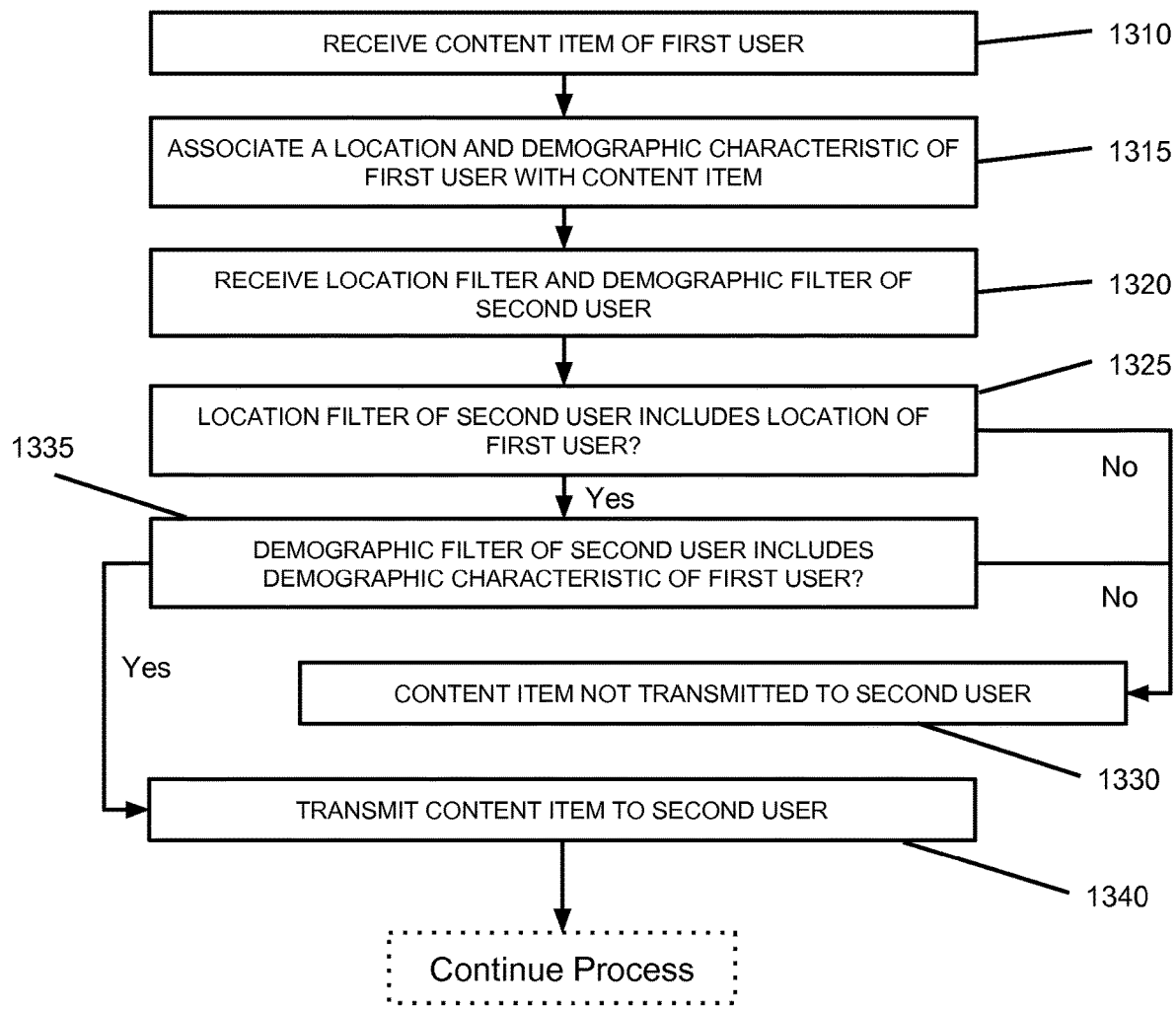
FIG. 13A is a flow diagram illustrating a method for sharing content according to one embodiment of the present disclosure.
Figure 13B:
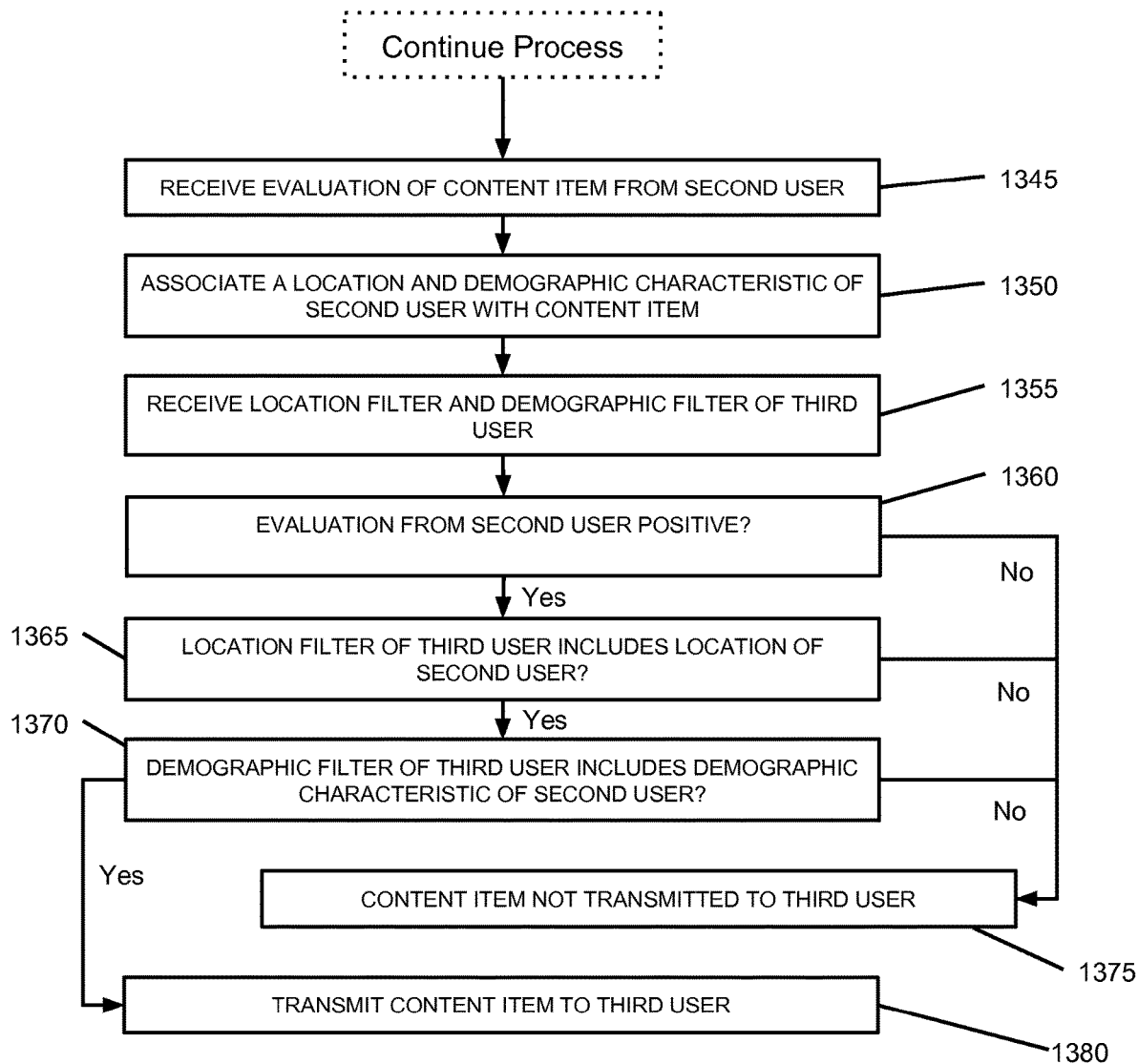
FIG. 13B is a flow diagram illustrating a method for sharing content according to one embodiment of the present disclosure.

FIGS. 13A and 13B are flow diagrams illustrating a method for sharing content according to another embodiment of the present disclosure. With reference to FIG. 13A, at step 1310, a host server system 12 receives a content item from a first user. At step 1315, the host server system 12 associates with the content item a location and a demographic characteristic of the first user. At step 1320, the host server system 12 receives a location filter and a demographic filter of a second user. At step 1325, the host server system 12 determines whether the location filter of the second user includes the location of the first user. If the filter includes the location, the process proceeds to step 1335; if the filter does not include the location, the process proceeds to step 1330. At step 1335, the host server system 12 determines whether the demographic filter of the second user includes the demographic characteristic of the first user. If the filter includes the demographic characteristic, the process proceeds to step 1340; if the filter does not include the demographic characteristic, the process proceeds to step 1330. At step 1330, the host server system 12 does not transmit the content item to the second user. At step 1340, the host server system 12 transmits the content item to the second user. The process the continues in FIG. 13B. At step 1345, the host server system 12 receives an evaluation of a content item from a second user. At step 1350, the host server system 12 associates a location and a demographic characteristic of a second user with the content item. At step 1355, the host server system 12 receives a location filter and demographic filter of a third user. At step 1360, the host server system 12 determines whether the evaluation from the second user was positive. If the evaluation is positive, the process proceeds to step 1365; if the evaluation was not positive, the process proceeds to step 1375. At step 1365, the host server system 12 determines whether the location filter of the third user includes the location of the second user. If the filter includes the location, the process proceeds to step 1370; if the filter does not include the location, the process proceeds to step 1375. At step 1370, the host server system 12 determines whether the demographic filter of the third user includes demographic characteristic of the second user. If the filter includes the demographic characteristic, the process proceeds to step 1380; if the filter does not include the demographic characteristic, the process proceed to step 1375. At step 1375, the host server system 12 does not transmit the content item to the third user. At step 1380, the host server system 12 transmits the content item to the third user.

Figure 14:
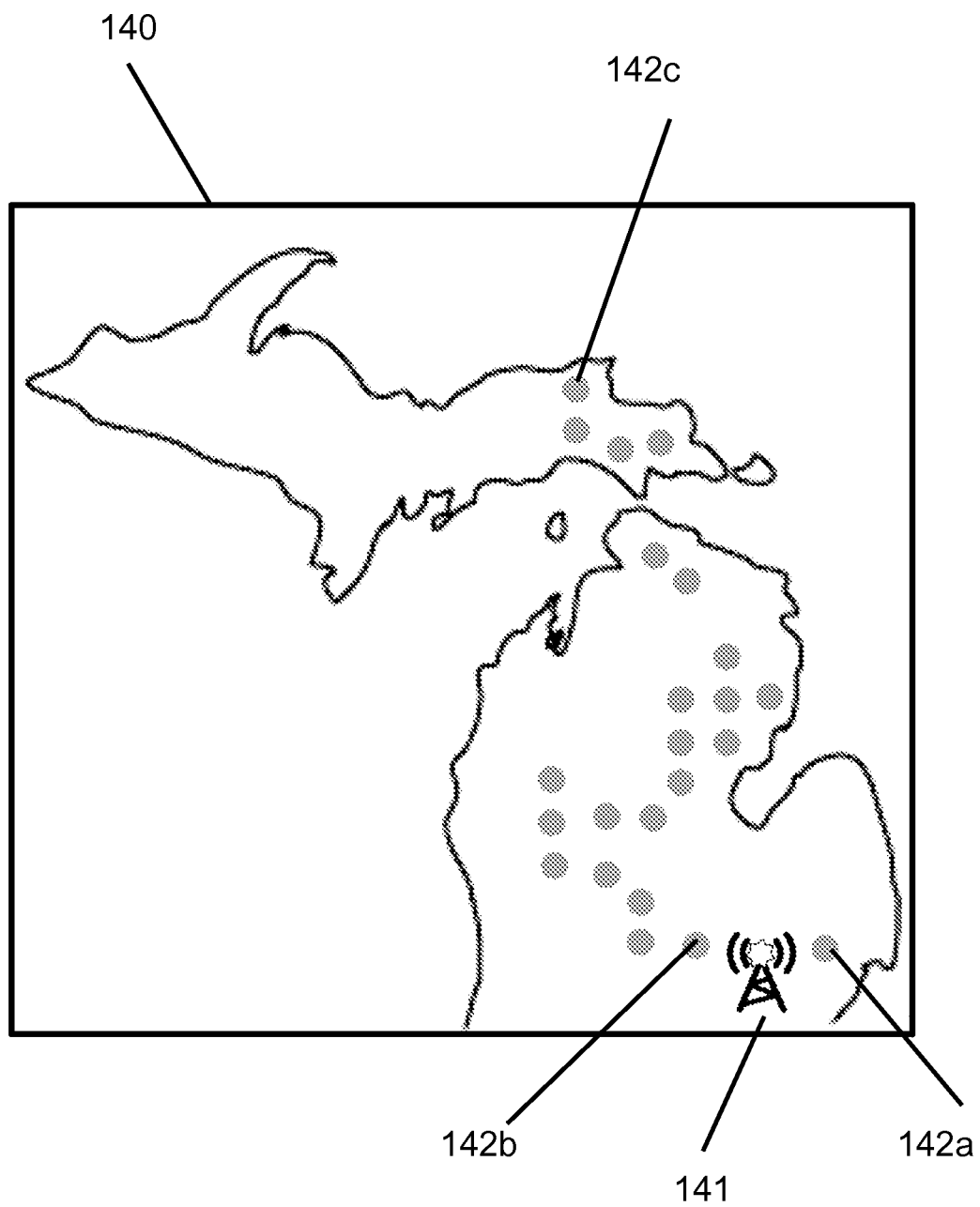
FIG. 14 illustrates an exemplary heat map showing a content item that is transmitted from an initial location to a plurality of different locations.

Graphical tools within the content sharing application 34 may allow users to view the geographical spread of content items, i.e. the application may visually represent the transmission of content items from one location to another. FIG. 14 illustrates an exemplary heat map 140 showing a content item that is transmitted initially from a location 141 in Ann Arbor, Mich. The content item is transmitted to various locations in the state of Michigan, including a location 142a to the east of Ann Arbor, a location 142b to the west of Ann Arbor, and a location 142c in the upper peninsula of Michigan. Graphical tools may show the transmission of content items in real time as users receive and retransmit them or as part of periodically updated maps. Further, the tools may indicate the degree to which a content item has been transmitted within portions of a geographical area. For example, a heat map may identify regions with heavy retransmission of a particular content item using a red overlay, regions with light retransmission using a light blue overlay, regions with no transmission using a transparent overlay or no overlay, and regions with intermediate transmission using appropriate intermediate colors.

What is claimed is:

1. A computer-implemented method for sharing content comprising:
   receiving a content item from a first user;
   associating a first demographic characteristic of the first user with the content item;
   receiving a first demographic filter from a second user;
   transmitting the content item to the second user, based on a determination that the first demographic filter includes the first demographic characteristic;
   associating a second demographic characteristic of the second user with the content item,
      wherein the second demographic characteristic is different than the first demographic characteristic;
   receiving an evaluation of the content item from the second user;
   receiving a second demographic filter from a third user,
      wherein the second demographic filter does not include the first demographic characteristic; and
   transmitting the content item to the third user, based on a determination that the second demographic filter includes the second demographic characteristic and that the evaluation is positive.

2. A method according to claim 1, further comprising:
   associating a first location with the content item,
      wherein the first location is at least one of a location of the first user and a location designated by the first user; and
   receiving a first location filter from the second user, and
   wherein the transmitting the content item to the second user is further based on a determination that the first location filter includes the first location.

3. A method according to claim 2, further comprising:
   associating a second location with the content item,
      wherein the second location is at least one of a location of the second user and a location designated by the second user; and
   receiving a second location filter from the third user, and
   wherein the transmitting the content item to the third user is further based on a determination that the second location filter includes the second location.

4. A method according to claim 3, wherein the second location filter does not include the first location.

5. A method according to claim 4, wherein:
   the first location filter comprises a first geographical area identified by a center and a radius, and
   the first location is within the first geographical area.

6. A method according to claim 5, wherein:
   the second location filter comprises a second geographical area identified by a center and a radius,
   the first location is not within the second geographical area, and
   the second location is within the second geographical area.

7. A method according to claim 6, wherein the first geographical area and the second geographical area overlap.

8. A method according to claim 1, further comprising:
   receiving, from the second user, an evaluation of the content item; and
   adding the content item to a retransmission list, based on a determination that the evaluation is positive, and
   wherein the transmitting the content item to the third user is further based on the content item being added to the retransmission list.

9. A method according to claim 1, wherein each of the first and second demographic characteristics is selected from the group consisting of age and gender.

10. A system comprising one or more computers and one or more storage devices storing instructions that when executed by the one or more computers cause the one or more computers to perform operations comprising:
   receiving a content item from a first user;
   associating a first demographic characteristic of the first user with the content item;

receiving a first demographic filter from a second user;

transmitting the content item to the second user, based on a determination that the first demographic filter includes the first demographic characteristic;

associating a second demographic characteristic of the second user with the content item,
wherein the second demographic characteristic is different than the first demographic characteristic;

receiving an evaluation of the content item from the second user;

receiving a second demographic filter from a third user, wherein the second demographic filter does not include the first demographic characteristic; and transmitting the content item to the third user, based on a determination that the second demographic filter includes the second demographic characteristic and that the evaluation is positive.

11. A system according to claim 10, wherein the operations further comprise:

associating a first location with the content item,
wherein the first location is at least one of a location of the first user and a location designated by the first user; and receiving a first location filter from the second user, and wherein the transmitting the content item to the second user is further based on a determination that the first location filter includes the first location.

12. A system according to claim 11, wherein the operations further comprise:

associating a second location with the content item,
wherein the second location is at least one of a location of the second user and a location designated by the second user; and receiving a second location filter from the third user, and wherein the transmitting the content item to the third user is further based on a determination that the second location filter includes the second location.

13. A system according to claim 12, wherein:

the first location filter comprises a first geographical area identified by a center and a radius, and the first location is within the first geographical area.

14. A system according to claim 13, wherein:

the second location filter comprises a second geographical area identified by a center and a radius, the first location is not within the second geographical area, and the second location is within the second geographical area.

15. A system according to claim 10, wherein the operations further comprise:

adding the content item to a retransmission list, based on the determination that the evaluation is positive, and wherein the transmitting the content item to the third user is further based on the content item being added to the retransmission list.

16. A system according to claim 10, wherein the operations further comprise:

receiving, from the third user, an evaluation of the content item;

associating a third demographic characteristic of the third user with the content item;

receiving, from a fourth user, a third demographic filter, wherein the third demographic filter includes the third demographic characteristic; and determining that the content item should not be transmitted to the fourth user, based on a determination that the evaluation is negative.

17. A computer program product encoded on one or more non-transitory computer storage media, the computer program product comprising instructions that when executed by one or more computers cause the one or more computers to perform operations comprising:

receiving a content item from a first user;

associating a first demographic characteristic of the first user with the content item;

receiving a first demographic filter from a second user;

transmitting the content item to the second user, based on a determination that the first demographic filter includes the first demographic characteristic;

associating a second demographic characteristic of the second user with the content item,
wherein the second demographic characteristic is different than the first demographic characteristic;

receiving an evaluation of the content item from the second user;

receiving a second demographic filter from a third user, wherein the second demographic filter does not include the first demographic characteristic; and transmitting the content item to the third user, based on a determination that the second demographic filter includes the second demographic characteristic and that the evaluation is positive.

18. A computer program product according to claim 17, wherein the operations further comprise:

associating a first location with the content item,
wherein the first location is at least one of a location of the first user and a location designated by the first user; and receiving a first location filter from the second user;

associating a second location with the content item,
wherein the second location is at least one of a location of the second user and a location designated by the second user; and receiving a second location filter from the third user,
wherein the transmitting the content item to the second user is further based on a determination that the first location filter includes the first location, and wherein the transmitting the content item to the third user is further based on a determination that the second location filter includes the second location.

* * * * *